US008873078B2

(12) United States Patent
Otake et al.

(10) Patent No.: US 8,873,078 B2
(45) Date of Patent: Oct. 28, 2014

(54) IMAGE FORMING APPARATUS, PRINT METHOD, AND RECORDING MEDIUM INVOLVING A COMPARISON BETWEEN THE NUMBER OF SHEETS OF E-PAPER AND NUMBER OF COPIES SPECIFIED BY USER

(71) Applicant: Konica Minolta, Inc., Chiyoda-ku (JP)

(72) Inventors: Toshihiko Otake, Ikeda (JP); Takeshi Hibino, Toyokawa (JP); Hideyuki Matsuda, Hirakata (JP); Toshikazu Kawaguchi, Kobe (JP); Masayuki Kawamoto, Amagasaki (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/973,633

(22) Filed: Aug. 22, 2013

(65) Prior Publication Data
US 2014/0055802 A1   Feb. 27, 2014

(30) Foreign Application Priority Data

Aug. 22, 2012 (JP) ................. 2012-183683

(51) Int. Cl.
*G06F 3/12* (2006.01)
*B41J 3/407* (2006.01)
*G06K 15/02* (2006.01)
*H04N 1/00* (2006.01)
*G06F 3/14* (2006.01)

(52) U.S. Cl.
CPC ............. *G06F 3/1274* (2013.01); *B41J 3/4076* (2013.01); *G06K 15/02* (2013.01); *G06F 3/1446* (2013.01); *H04N 1/00127* (2013.01)
USPC .......... 358/1.13; 358/1.14; 358/1.15; 345/1.1

(58) Field of Classification Search
CPC ... B41J 3/4076; H04N 1/00127; G06F 3/1454
USPC .................................. 358/1.13; 345/168, 211
See application file for complete search history.

(56) References Cited

U.S. PATENT DOCUMENTS

2007/0229393 A1* 10/2007 Ishii et al. ....................... 345/1.1
2011/0255116 A1* 10/2011 Inoue et al. ................... 358/1.13

FOREIGN PATENT DOCUMENTS

JP       2007-316925 A    12/2007

* cited by examiner

*Primary Examiner* — Benny Q Tieu
*Assistant Examiner* — Juan M Guillermety
(74) *Attorney, Agent, or Firm* — Buchanan Ingersoll & Rooney PC

(57) ABSTRACT

An image forming apparatus comprising: an e-paper storage that loads one or more sheets of e-paper; a first transmitter that transmits a target image to the one or more sheets of e-paper loaded on the e-paper storage; a detector that detects when the target image is seen via any of the one or more sheets of e-paper; a judgment portion that judges whether or not the number of sheets of e-paper via which the target image has been seen reaches the number of copies specified; and a request transmitter that, if the number of sheets of e-paper via which the target image has been seen reaches the number of copies specified while any of the one or more sheets of e-paper still remains in the e-paper storage without being seen, transmits a request to delete the target image to the remaining sheet of e-paper.

21 Claims, 9 Drawing Sheets

IMAGE FORMING APPARATUS, PRINT METHOD, AND RECORDING MEDIUM INVOLVING A COMPARISON BETWEEN THE NUMBER OF SHEETS OF E-PAPER AND NUMBER OF COPIES SPECIFIED BY USER

This application claims priority under 35 U.S.C. §119 to Japanese Patent Application No. 2012-183683 filed on Aug. 22, 2012, the entire disclosure of which is incorporated herein by reference in its entirety.

BACKGROUND OF THE INVENTION

1. Field of the Invention

The present invention relates to: an image forming apparatus that transmits images for printing to have it printed (displayed) on electronic paper loaded on an electronic paper storage; an electronic paper printing method to be implemented by the image forming apparatus; and a non-transitory computer-readable recording medium with an electronic paper printing program being stored thereon.

2. Description of the Related Art

The following description sets forth the inventor's knowledge of related art and problems therein and should not be construed as an admission of knowledge in the prior art.

There has been known an image forming apparatus that is not only capable of printing on ordinary paper, images for printing received from personal computers and document images obtained by its scanner, for example, but also capable of transferring the same to electronic paper to have it displayed thereon.

When preparing handouts of electronic paper for multiple users by using such an image forming apparatus, an operator user would be required to make sure how many sheets of electronic paper to share are available; then, specify by using a driver on his/her personal computer, how many sheets of electronic paper will be actually necessary and transmit images for printing to the image forming apparatus, so that the image forming apparatus can transfer them for printing to electronic paper to have it displayed thereon. Alternatively, after making sure how many sheets of electronic paper are available, he/she would be required to specify how many sheets of electronic paper will be actually necessary by operating an operation panel of the image forming apparatus and obtain document images with a scanner of the image forming apparatus, so that the image forming apparatus can transfer them to electronic paper to have it displayed thereon.

As disclosed in Japanese Unexamined Patent Publication No. 2007-316925, there has been an image display method for the purpose of improving the user-friendliness when a user hopes to display images stored on a portable terminal apparatus, in a preferred layout onto a large-screen display apparatus such as a television or personal computer; and in this method, it is judged whether or not a terminal apparatus 200 is in contact with an image display 101 of a display apparatus 100; if it is in contact therewith, the terminal apparatus 200 transmits specified images to the display apparatus 100; the display apparatus 100 adjusts the layout of the specified images on the basis of the contact state of the terminal apparatus 200, indicating whether or not it is in contact with the image display 101.

Prior to the invention, there had been a problem such that it is extremely troublesome to prepare electronic paper handouts for multiple users because of its user-friendliness, i.e.; an operator user is required to specify how many sheets of electronic paper will be actually necessary, either by using a driver of his/her personal computer or by operating an operation panel of the image forming apparatus, after making sure how many sheets of electronic paper are available, as described above.

Unfortunately, the invention described in Japanese Unexamined Patent Publication No. 2007-316925 did not provide any perfect solution to the problem mentioned above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image forming apparatus comprising:
- an electronic paper storage that loads one or more sheets of electronic paper;
- a print data transmitter that transmits a target image to the one or more sheets of electronic paper loaded on the electronic paper storage;
- a detector that detects when the target image is seen via any of the one or more sheets of electronic paper;
- a judgment portion that judges whether or not the number of sheets of electronic paper via which the target image has been seen reaches the number of copies specified by user; and
- a request transmitter that, if the number of sheets of electronic paper via which the target image has been seen reaches the number of copies specified while any of the one or more sheets of electronic paper still remains in the electronic paper storage without being seen, transmits a request to delete the target image to the remaining sheet of electronic paper.

A second aspect of the present invention relates to an electronic paper printing method to be implemented by an image forming apparatus comprising an electronic paper storage that loads one or more sheets of electronic paper, the electronic paper printing method comprising:
- transmitting a target image to the one or more sheets of electronic paper loaded on the electronic paper storage;
- detecting when the target image is seen via any of the one or more sheets of electronic paper;
- judging whether or not the number of sheets of electronic paper via which the target image has been seen reaches the number of copies specified by user; and
- if the number of sheets of electronic paper via which the target image has been seen reaches the number of copies specified while any of the one or more sheets of electronic paper still remains in the electronic paper storage without being seen, transmitting a request to delete the target image to the remaining sheet of electronic paper.

A third aspect of the present invention relates to a non-transitory computer-readable recording medium with an electronic paper printing program being stored thereon to make a computer of an image forming apparatus comprising an electronic paper storage that loads one or more sheets of electronic paper, execute:
- transmitting a target image to the one or more sheets of electronic paper loaded on the electronic paper storage;
- detecting when the target image is seen via any of the one or more sheets of electronic paper;
- judging whether or not the number of sheets of electronic paper via which the target image has been seen reaches the number of copies specified by user; and if the number of sheets of electronic paper via which the target image has been seen reaches the number of copies specified while any of the one or more sheets of electronic paper still remains in the electronic paper storage without being seen, transmitting a request to delete the target image to the remaining sheet of electronic paper.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described in combination with the accompanying drawings.

Figure 1:
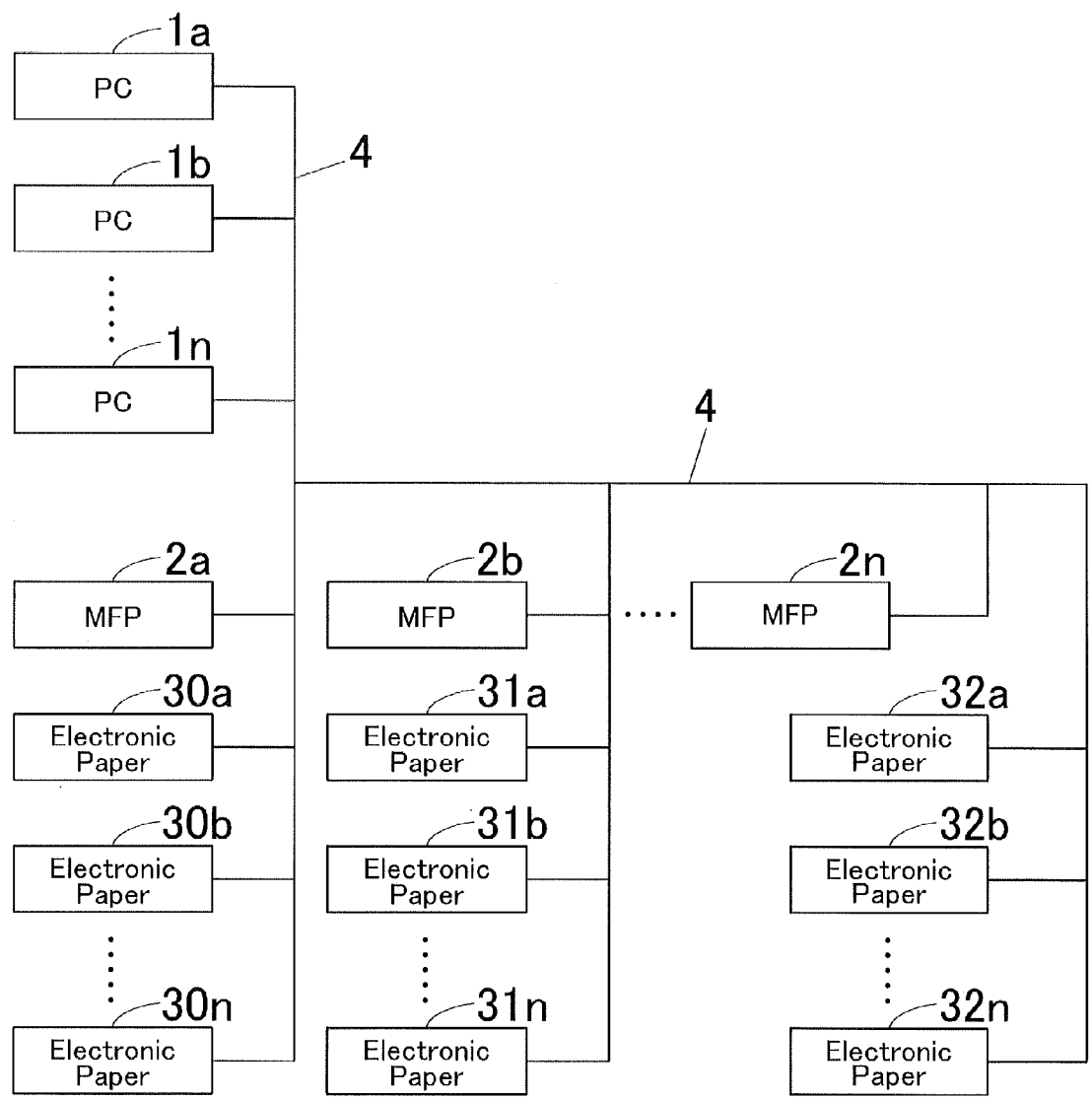
FIG. 1 is a block diagram illustrating a configuration of an image forming system having an image forming apparatus according to one embodiment of the present invention.
Figure 2:
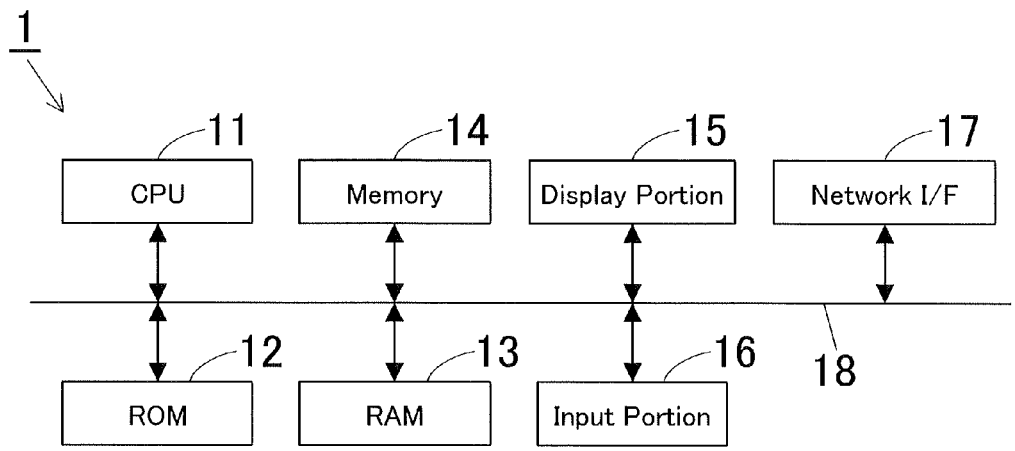
FIG. 2 is a block diagram illustrating a hardware configuration of an information processing apparatus.

FIG. 1 is a block diagram illustrating a configuration of an image forming system having an image forming apparatus according to one embodiment of the present invention.

As illustrated in FIG. 1, the image forming system is provided with: a plurality of information processing apparatuses (to also be referred to as "PCs" hereinafter) $1a, 1b, \ldots, 1n$ each being comprised of a personal computer; a plurality of image forming apparatuses $2a, 2b, \ldots, 2n$; and a plurality of sheets of electronic paper $30a, 30b, \ldots, 30n, 31a, 31b, \ldots, 31n, 32a, 32b, \ldots, 32n$, all of which are capable of connecting to each other via a network 4 that is a wired or wireless local area network (LAN).

Hereinafter, a PC 1 will be described on behalf of all the PCs $1a, 1b, \ldots, 1n$ whose configurations are almost identical with each other. Similarly, an image forming apparatus 2 will be hereinafter described on behalf of all the image forming apparatuses $2a, 2b, \ldots, 2n$ whose configurations are almost identical with each other. Still similarly, a sheet of electronic paper 3 will be hereinafter described on behalf of all the sheets of electronic paper $30a, 30b, \ldots, 30n, 31a, 31b, \ldots, 31n, 32a, 32b, \ldots, 32n$, whose configurations are almost identical with each other.

The PC 1 serving as a user terminal apparatus is provided with: a CPU 11; a ROM 12; a RAM 13; a memory 14; a display portion 15; an input portion 16; a network interface (network I/F) 17; and the like, all of which are connected to each other via a system bus 18.

The CPU 11 loads operation programs onto the RAM 13 from the ROM 12 or the memory 14 and controls the entire PC 1 in a unified and systematic manner by executing the operation programs loaded thereon. Specifically, the CPU 11 creates documents in accordance with a document creation program and transmits them to the image forming apparatus 2 along with print information such as print instructions, the number of copies specified, and the like so that the image forming apparatus 2 can print out the documents on sheets of electronic paper 3 or sheets of ordinary paper.

The ROM 12 is a recording medium that stores operation programs to be executed by the CPU 11 and other data.

The RAM 103 is a memory that provides a work area for the CPU 11 to perform processing in accordance with operation programs.

The memory 14, which is comprised of a recording medium such as a hard disk drive, stores document data, application software, and the like.

The display portion 15, which is comprised of a CRT or liquid crystal display, displays various messages, entry screens, selection screens, and the like for users.

The input portion 16 serves for user input, being provided with a keyboard, a mouse, and the like.

The network interface 17 serves as a communicator that exchanges data among the image forming apparatus 2, sheets of electronic paper 3, and other external devices, via the network 4.

Figure 3:
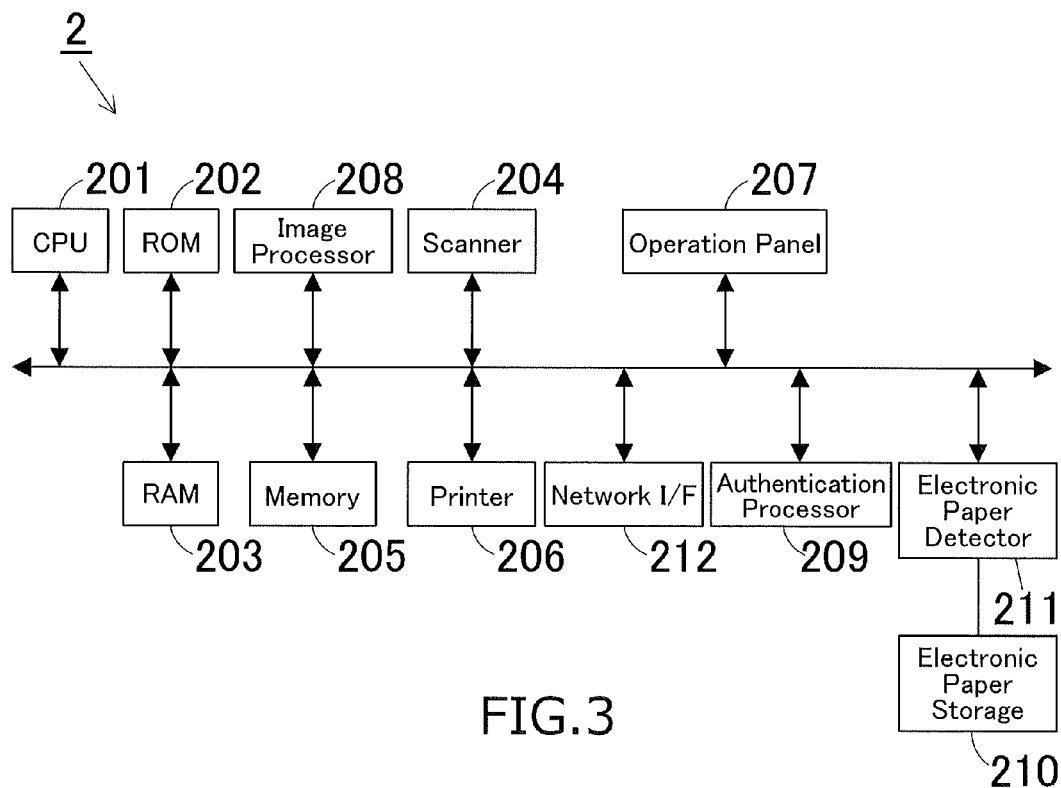
FIG. 3 is a block diagram illustrating a hardware configuration of an image forming apparatus.

FIG. 3 is a block diagram illustrating a hardware configuration of the image forming apparatus 2. In this embodiment, a multifunction peripheral (MFP), i.e., a multifunctional digital machine is employed as the image forming apparatus 2. Hereinafter, the image forming apparatus 2 will also be referred to as MFP 2.

The MFP 2 is provided with: a CPU 201; a ROM 202; a RAM 203; a scanner 204; a memory 205; a printer 206; an operation panel 207; an image processor 208; an authentication processor 209; an electronic paper storage 210; an electronic paper detector 211; a network interface (network I/F) 212; and the like.

The CPU 201 controls the entire MFP 2 in a unified and systematic manner to allow using the basic functions of the MFP 2, such as copier, printer, scanner, and facsimile function. Specifically, in this embodiment, the CPU 201 transmits an image for printing to a sheet of electronic paper 3 via the network interface 212 and also transmits a request to delete the data for printing to a sheet of electronic paper 3 via the network interface 212. Furthermore, the CPU 201 judges whether or not any sheet of electronic paper 3 is loaded on the electronic paper storage 210, by the electronic paper detector 211; count the number of sheets of electronic paper 3 loaded on the electronic paper storage 210; and counts the number of sheets of electronic paper 3 having been taken out of the electronic paper storage 210.

The RAM 202 is a memory that stores operation programs to be executed by the CPU 201 and other data.

The RAM 203 is a memory that provides a work area for the CPU 201 to perform processing in accordance with operation programs.

The scanner 204 reads a document put on a platen (not illustrated in this figure) to output images therefrom.

The memory 205, which is comprised of a non-volatile memory device such as a hard disk drive (HDD), stores print information including: images for printing on electronic paper, which are received from the PC 1; document images obtained by the scanner 204, as images for printing on electronic paper; and the number of copies specified by an operator user when giving print instructions.

The printer 206 prints document images obtained by the scanner 204, images for printing received from the information processing apparatus 1, and the like on ordinary paper.

The operation panel 207 serves for user input for settings or instructions, being provided with: a display portion comprised of a liquid-crystal display with touch-panel functionality that displays messages and operation screens; and a key input section provided with a numeric keypad; a Start key; a Stop key; and other keys.

The image processor 208 performs certain image processing on document images obtained by the scanner 204.

The authentication processor 209 performs user authentication when someone is trying to log on the MFP 2 or print confidential materials by the MFP 2, for example.

Figure 5:
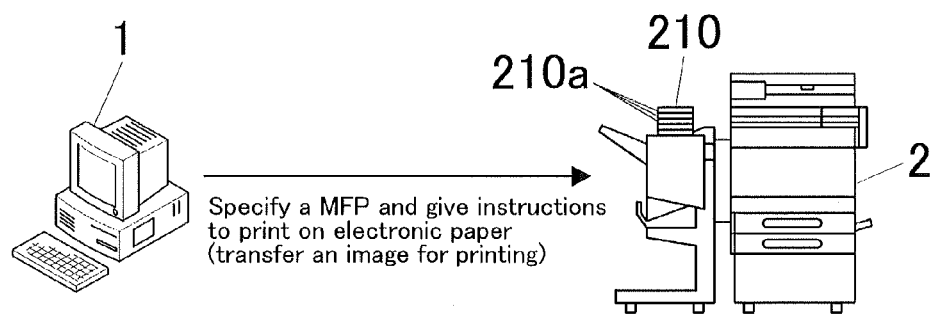
FIG. 5 is a view to explain the operation how the information processing apparatus transmits an image for printing to the image processing apparatus.

The electronic paper storage 210 holds a plurality of sheets of electronic paper 3, and as illustrated in FIG. 5, the electronic paper storage 210 is provided with a plurality of rooms (also referred to as "docks") 210a each of which can hold one sheet of electronic paper 3. Each dock 210a is provided with a connector that can establish an electrical and physical connection between the MFP 2 and a sheet of electronic paper 3 when the sheet of electronic paper 3 is loaded thereon.

The electronic paper detector 211 detects when a sheet of electronic paper 3 is loaded on the electronic paper storage 210 by detecting establishment of an electrical and physical connection between the MFP 2 and the sheet of electronic paper 3; and detects when a sheet of electronic paper 3 is taken out of the electronic paper storage 210 by detecting termination of an electrical and physical connection between the MFP 2 and the sheet of electronic paper 3. This means that the MFP 2 is allowed to count the number of sheets of electronic paper 3 loaded on the electronic paper storage 210.

When the electronic paper storage 210 receives a sheet of electronic paper 3, i.e.; when the MFP 2 and a sheet of electronic paper 3 establish an electrical and physical connection to each other, the CPU 201 is allowed to obtain information of the sheet of electronic paper 3 such as its serial number or IP address, by communicating therewith via the connection.

In this embodiment, the MFP 2 detects when a sheet of electronic paper 3 is loaded on the electronic paper storage 210, by establishment of an electrical and physical connection between the MFP 2 and the sheet of electronic paper 3; detects when a sheet of electronic paper 3 is taken out of the electronic paper storage 210, by detecting termination of an electrical and physical connection between the MFP 2 and the sheet of electronic paper 3; and obtains identification information of the sheet of electronic paper 3 having just been loaded thereon, by communicating therewith via the connection. Alternatively, the MFP 2, which is further provided with a wireless communicator that is capable of conducting wireless communication between the MFP 2 and the sheet of electronic paper 3 with high directionality, may detect when a sheet of electronic paper 3 is loaded on and is taken out of the electronic paper storage 210 and also may obtain identification information of the sheet of electronic paper 3 having just been loaded thereon, by communicating therewith using the wireless communicator.

Still alternatively, the MFP 2, which is further provided with an optical camera, may detect when a sheet of electronic paper 3 is loaded on and is taken out of the electronic paper storage 210 and also may obtain identification information of the sheet of electronic paper 3 having just been loaded thereon, by taking photos of the sheet of electronic paper 3 and others, using the optical camera.

The network interface 212 performs data communication by controlling connections to the PC 1 on the network 4 and sheets of electronic paper 3, for example.

Figure 4:
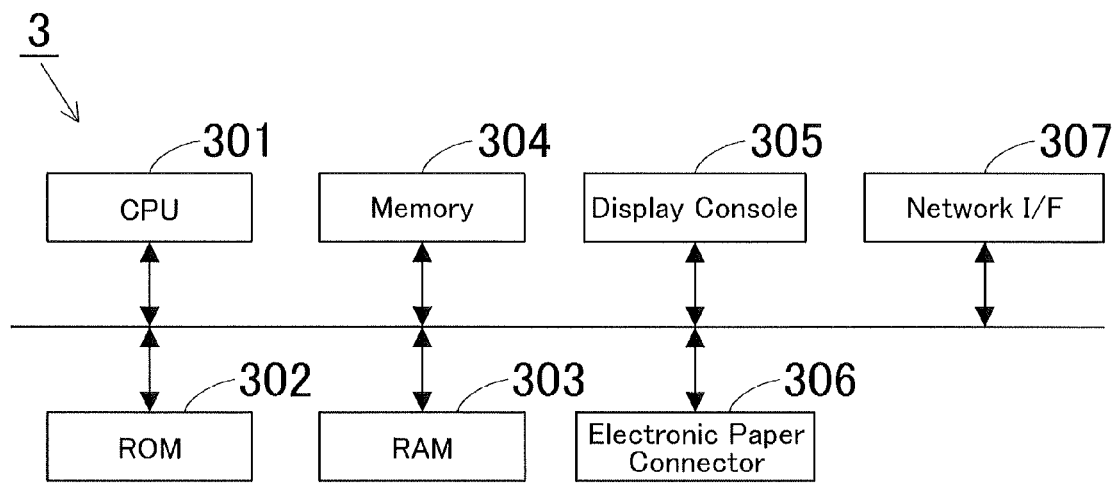
FIG. 4 is a block diagram illustrating a hardware configuration of electronic paper.

FIG. 4 is a block diagram illustrating a hardware configuration of a sheet of electronic paper 3.

A sheet of electronic paper 3 is provided with: a CPU 301; a ROM 302; a RAM 303; a memory 304; a display console 305; an electronic paper connector 306; a network interface (network I/F) 307; and the like.

The CPU 301 controls the entire electronic paper 3 in a unified and systematic manner by executing operation programs stored on a recording medium such as the ROM 302. Specifically, the CPU 301 displays images for printing received from the MFP 2 on the display console 305 and also hides them on the display console 305 in accordance with instructions from the MFP 2.

The ROM 302 is a recording medium that stores operation programs for the CPU 11 and other data.

The RAM 303 is a memory that provides a work area for the CPU 301 to perform processing in accordance with operation programs.

The memory 304 stores images for printing received from the MFP 2 and identification information of a sheet of electronic paper 3 such as its serial number or IP address.

The display console 305 is comprised of a display element such as a liquid crystal display with touch panel functionality, serving as a combination of a display and operation portion.

The electronic paper connector 306 serves as a connector that establishes an electrical and physical connection with the MFP 2 when a sheet of electronic paper 3 is loaded on the electronic paper storage 210 of the MFP 2.

The network interface 307 serves as a communicator that performs data exchange with the MFP 2 and other devices connected to the network 4, via the network 4.

Hereinafter, how an image is printed on a sheet of electronic paper 3 by the MFP 2 will be described.

First, an operator user has to prepare an image for printing on a sheet of electronic paper 3. In this embodiment, the operator user transmits the image for printing to the MFP 2 from the PC 1, as illustrated in FIG. 5. More specifically, after creating a document as an image for printing, the operator user displays a print setting screen on the display portion 15 by activating a printer driver installed on the PC 1.

Figure 6:
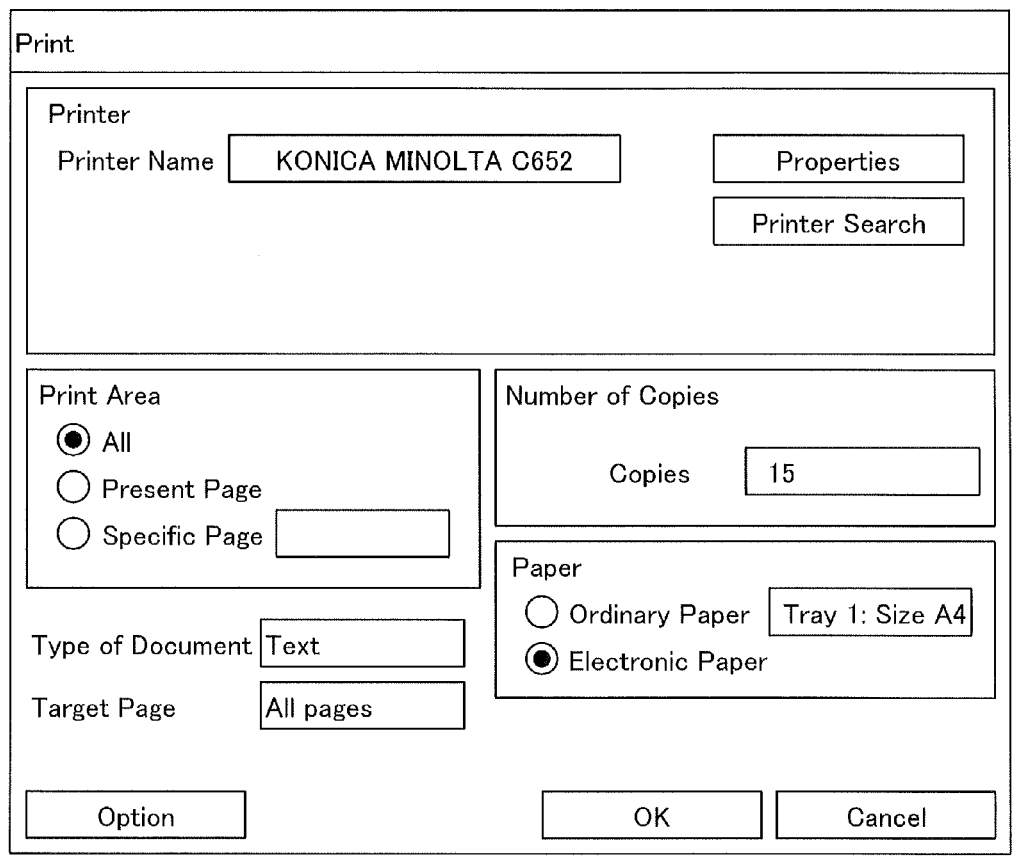
FIG. 6 illustrates an example of a print setting screen to be displayed on the information processing apparatus.

FIG. 6 illustrates one example of a print setting screen. The print setting screen allows users to select a printer (MFP) in charge, select either ordinary paper or electronic paper, set a print area; and specify the number of copies, for example.

In this example, an operator user selects the MFP 2 as a printer in charge, selects electronic paper as copy paper, and specifies the number of copies and other values in required fields. When the operator user gives print instructions, an image for printing and print information indicating the settings are transmitted to the MFP 2.

Users can select a specific printer in charge before printing in order to avoid too much traffic pouring in the network 4 unnecessarily; without selecting a specific printer, the image for printing will be transmitted to every MFP 2 on the network 4, producing an undesirable result.

Figure 7:
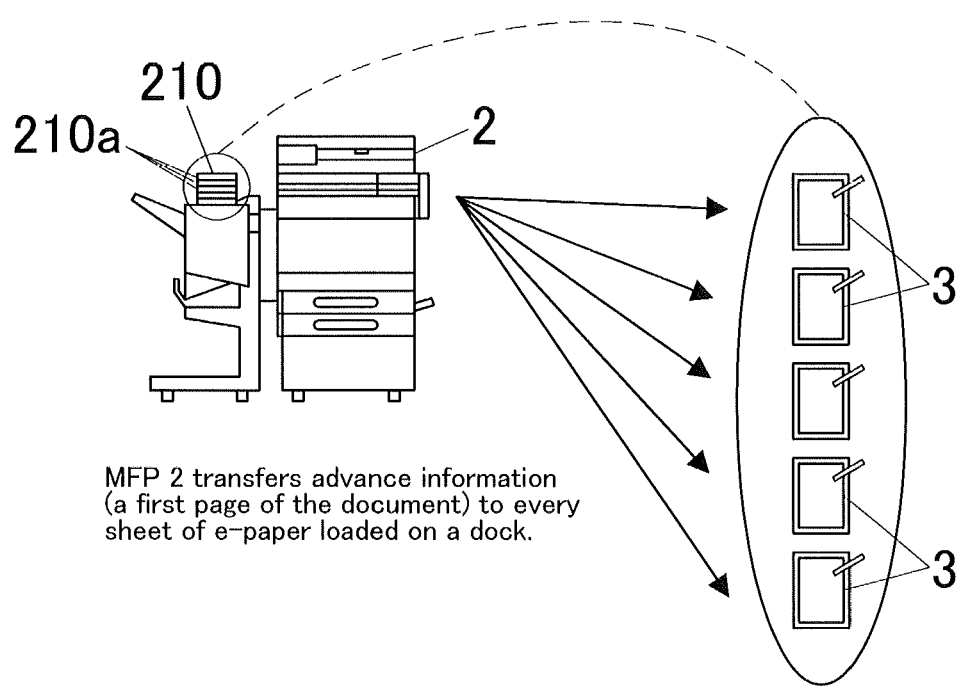
FIG. 7 is a view to explain the operation how the image forming apparatus transfers an image for printing to electronic paper.

Receiving the image for printing, the MFP 2 collects identification information from every sheet of electronic paper 3 loaded on the electronic paper storage 210 via the electrical and physical connections between the electronic paper storage 210 and every sheet of electronic paper 3. Then the MFP 2 counts the number of sheets of electronic paper 3 loaded on the electronic paper storage 210 and transfers the image for printing to the sheets of electronic paper 3 loaded thereon, via the network 4 as illustrated in FIG. 7.

Here, the MFP 2 may transfer all the images for printing to the sheets of electronic paper 3 loaded thereon; however, in this embodiment, the MFP 2 transfers thereto a part of the images for printing, e.g., a first page of the document, as advance information. Each sheet of electronic paper 3 loaded thereon receives the advance information and stores on the memory 304.

As described above, each sheet of electronic paper 3 loaded thereon stores on the memory 304, advance information whose data size is smaller than that of all the images for printing, which contributes to making more effective use of the resources of electronic paper 3.

When a sheet of electronic paper 3 (it may have been taken out of the electronic paper storage 210) is additionally loaded on the electronic paper storage 210, the MFP 2 transfers advance information to the sheet of electronic paper 3 additionally loaded thereon, similarly.

Figure 8:
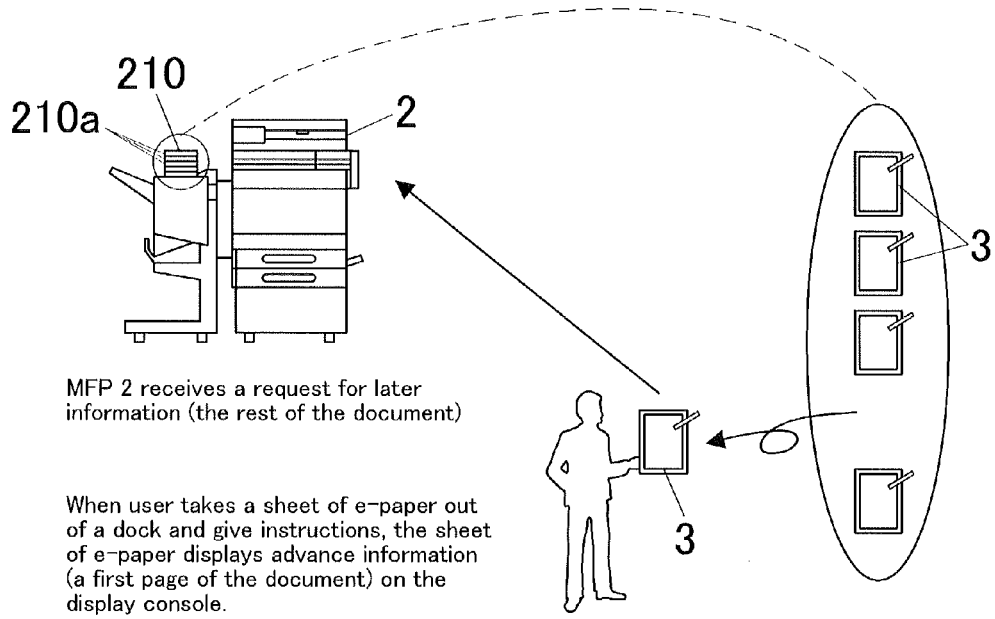
FIG. 8 is a view to explain the operation how a user can see an image on electronic paper.
Figure 9:
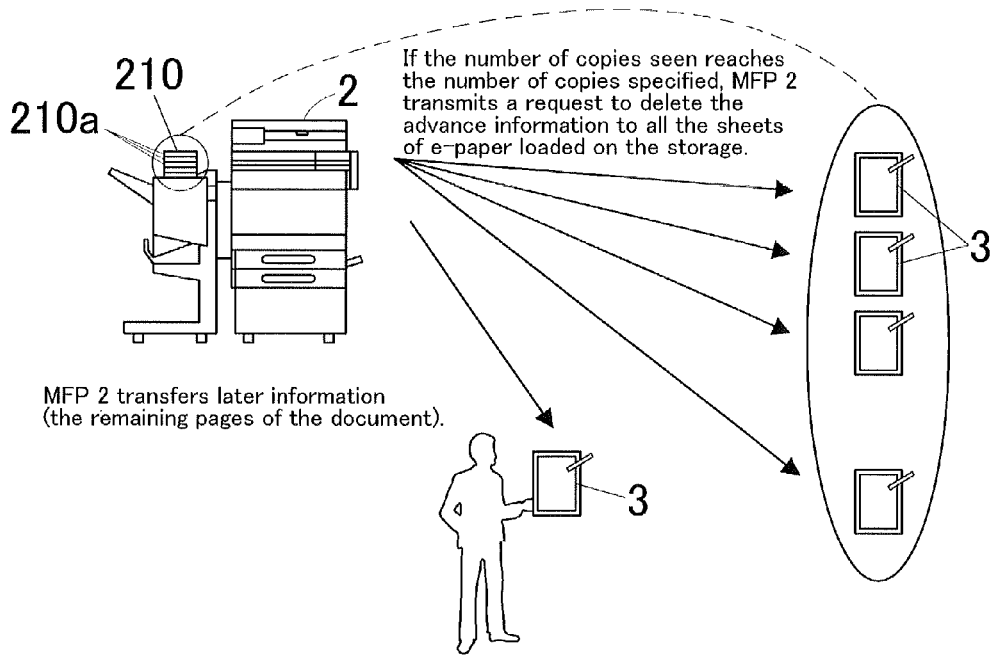
FIG. 9 is a view to explain the situation when the number of copies seen reaches the number of copies specified.

In order to see an image, a reader user takes a sheet of electronic paper out of the electronic paper storage 210 and gives instructions to display an image as illustrated in FIG. 8. Then the sheet of electronic paper 3 displays a first page of the document on the display console 305 on the basis of the advance information read out from the memory 304. Subsequently, the sheet of electronic paper 3 transmits a request for the remaining page(s) of the document to the MFP 2. The sheet of electronic paper 3 also transmits thereto a confirmation notice that confirms that the image has just been seen.

In return, the MFP 2 transmits the remaining page(s) of the document to the sheet of electronic paper 3 via the network 4. The MFP 2 also counts the number of sheets of electronic paper 3 in reader users' hands as the number of copies seen and judges whether or not the number of copies seen is equal to or greater than the number of copies specified.

If the number of copies seen is equal to or greater than the number of copies specified while any sheet of electronic paper 3 still remains in the electronic paper storage 210, i.e., any sheet of electronic paper 3 still not in reader user's hand, the MFP 2 transmits a request to delete the advance information stored on the memory 304, to the remaining sheet of electronic paper 3. In response to the request, the remaining sheet of electronic paper 3 deletes the advance information.

As described above, the MFP 2 transfers an image for printing (advance information) to all the sheets of electronic paper 3 loaded on the electronic paper storage 210 regardless of how many they are actually; but if the number of sheets of electronic paper 3 in reader users' hands (the number of copies seen) reaches the number of copies specified, a sheet of electronic paper 3 still remaining in the electronic paper storage 210, i.e., a sheet of electronic paper 3 still not in reader user's hand, deletes the image for printing. An operator user therefore would be simply required to give instructions to print on electronic paper in the same manner as giving instructions to print on ordinary paper, without the trouble of having to make sure how many sheets of electronic paper 3 are available and specify how many sheets of electronic paper 3 will be actually necessary, which contributes to the improvement of user-friendliness.

In the aforementioned embodiment, when displaying a first page of the document on the display console 305, a sheet of electronic paper 3 transmits to the MFP 2, a confirmation notice and a request for the remaining page(s) of the document. Alternatively, a sheet of electronic paper 3 may do the same when the MFP 2 detects termination of an electrical connection between the electronic paper storage 210 and the sheet of electronic paper 3. Still alternatively, a sheet of electronic paper 3 may do the same when a reader user gives instructions to display an image after taking it out of the electronic paper storage 210 or when a reader user flips to the second page on the display console 305. In each case, in terms of user-friendliness, it is preferred that a reader user perform a certain operation than giving user instructions to make the sheet of electronic paper 3 transmit a confirmation notice and a request for the remaining page(s) of the document to the MFP 2.

Meanwhile, in the aforementioned embodiment, the MFP 2 transfers the advance information to all the sheets of electronic paper 3 loaded on the electronic paper storage 210 regardless of how many they are actually. Alternatively, the MFP 2 may transfer the advance or entire information depending on how many they are actually.

In other words, if the number of sheets of electronic paper 3 loaded on the electronic paper storage 210 is greater than the number of copies specified by the PC 1, the MFP 2 transfers the advance information to all the sheets of electronic paper 3 loaded thereon. If the number of sheets of electronic paper 3 loaded on the electronic paper storage 210 is equal to or lower than the number of copies specified by the PC 1, the MFP 2 transfers the entire information to all the sheets of electronic paper 3 loaded thereon. And then, when a sheet of electronic paper 3 is additionally loaded on the electronic paper storage 210, the number of the sheets of electronic paper 3 having received the image for printing is compared to the number of copies specified; and if it is equal to or lower than the number of copies specified, the MFP 2 transfers the entire information to the sheet of electronic paper 3 additionally loaded thereon. If the number of the sheets of electronic paper 3 having received the image for printing is greater than the number of copies specified, the MFP 2 transfers the advance information to the sheet of electronic paper 3 additionally loaded thereon. Alternatively, the MFP 2 may transfer the advance information to all the sheets of electronic paper 3 now loaded on the electronic paper storage 210, including the sheet of electronic paper 3 additionally loaded thereon.

In other words, if the number of sheets of electronic paper 3 loaded on the electronic paper storage 210 is equal to or lower than the number of copies specified, the MFP 2 transfers the entire information to the sheet of electronic paper 3 because it would highly possibly be seen; if the number of sheets of electronic paper 3 loaded on the electronic paper storage 210 is greater than the number of copies specified, the MFP 2 transfers the advance information to the sheet of electronic paper 3 additionally loaded thereon or to all the sheets of electronic paper 3 loaded thereon, including the sheet of electronic paper 3 additionally loaded thereon, because it or they would hardly be seen.

Here in both cases, the sheets of electronic paper 3 having received the entire information would transmit a confirmation notice to the MFP 2 without a request for the remaining page(s) of the document because it is not necessary any more. If the number of copies seen reaches the number of copies specified while any sheet of electronic paper 3 having received the entire information, still remains in the electronic paper storage 210, the MFP 2 transmits a request to delete the entire information to the remaining sheet of electronic paper 3. In response to the request, the remaining sheet of electronic paper 3 deletes the entire information.

An operator user may give instructions to print a confidential document on electronic paper. In such a case, recognizing that it is confidential on the basis of user instructions, the MFP 2 transfers to all the sheets of electronic paper 3 loaded on the electronic paper storage 210, bibliographic information such as a name of the operator user and a file name, in addition to the advance information. After taking one of the sheets of electronic paper 3 loaded on the electronic paper storage 210, a reader user gives instructions to display an image on the sheet of electronic paper 3 now in the reader user's hand; then the sheet of electronic paper 3 displays only the bibliographic information on the display console 305. After that, when the reader user is successfully authorized by the authorization processor 209 via the sheet of electronic paper 3, the sheet of electronic paper 3 displays a first page of the document on the basis of the advance information; and when receiving the later information, the sheet of electronic paper 3 displays the remaining page(s) of the document. The MFP 2 may transfer the entire information to all the sheets of electronic paper 3 loaded on the electronic paper storage 210 instead of the advance information; after that, when the reader user is successfully authorized, the sheet of electronic paper 3 may display all pages of the document one by one on the basis of the entire information.

After the MFP 2 transfers the advance or entire information to the sheet of electronic paper 3, the operator user may further give instructions to print on ordinary paper by operating the operation panel 207 of the MFP 2. In such a case, the MFP 2 calculates the number of copies seen, by adding up the number of copies of ordinary paper and that of confirmation notices received from the sheets of electronic paper 3, and then if the number of copies seen is equal to or greater than the number of copies specified while any sheet of electronic paper 3 still remains in the electronic paper storage 210, the MFP 2 transmits a request to delete the image for printing to the remaining sheet of electronic paper 3, which could fulfill the intention of an operator user who hopes to have copies of both electronic paper and ordinary paper for reader users.

Figure 10:
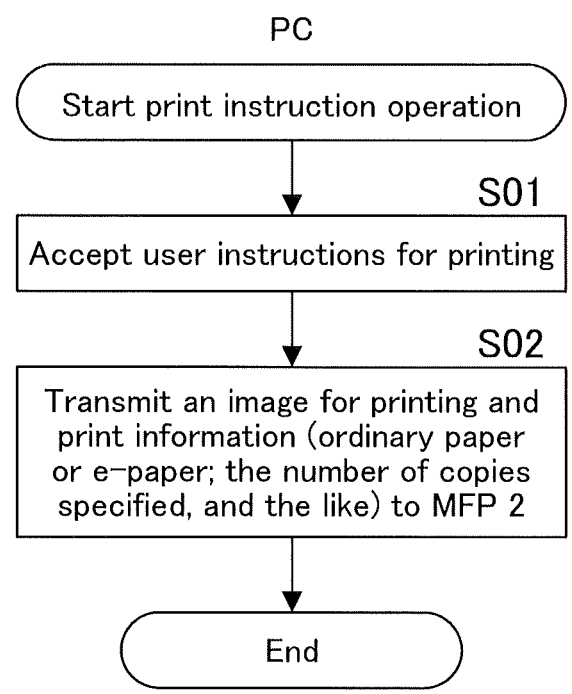
FIG. 10 is a flowchart representing the operation of the information processing apparatus.
Figure 11:
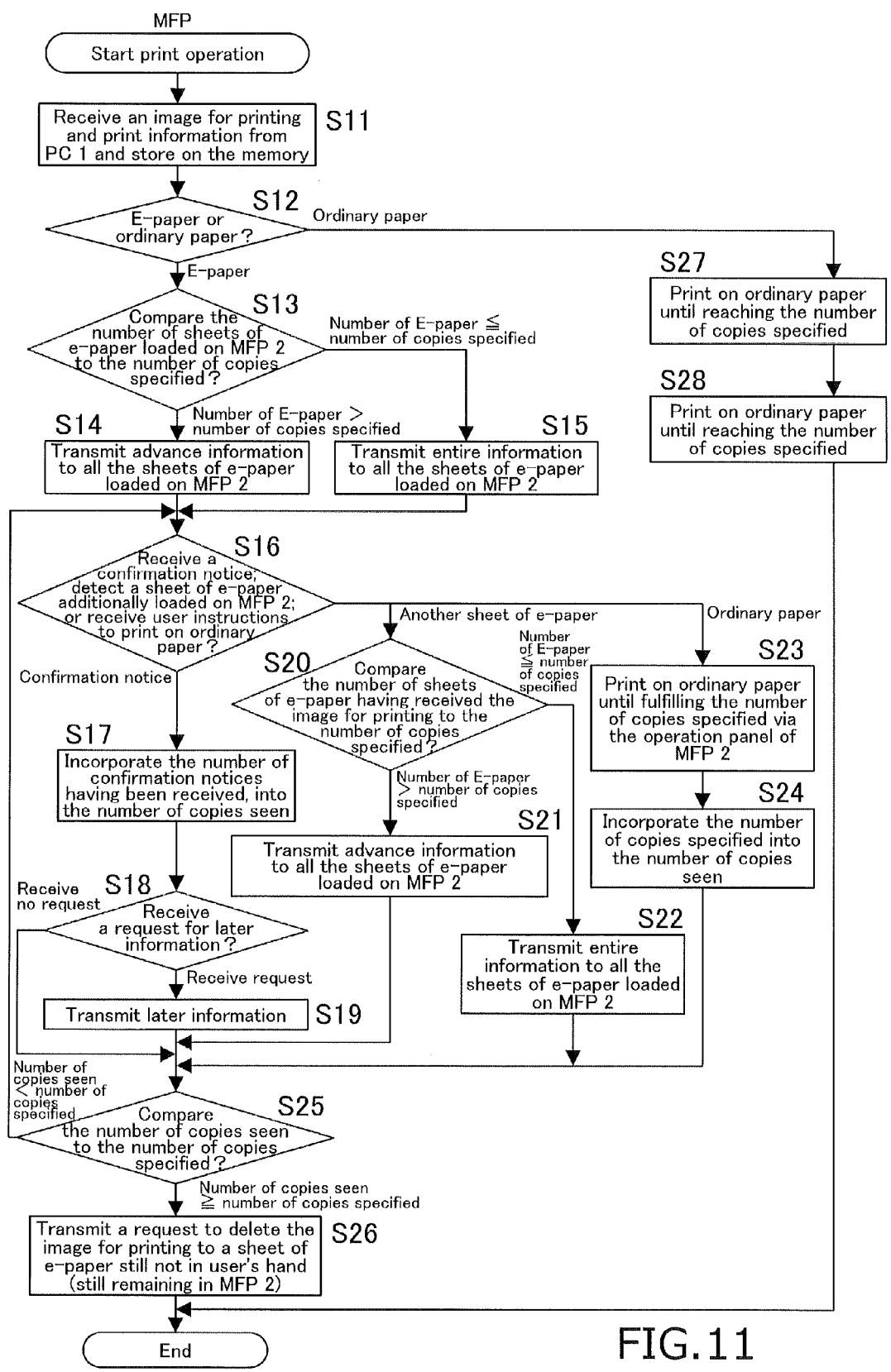
FIG. 11 is a flowchart representing the operation of the image forming apparatus.
Figure 12:
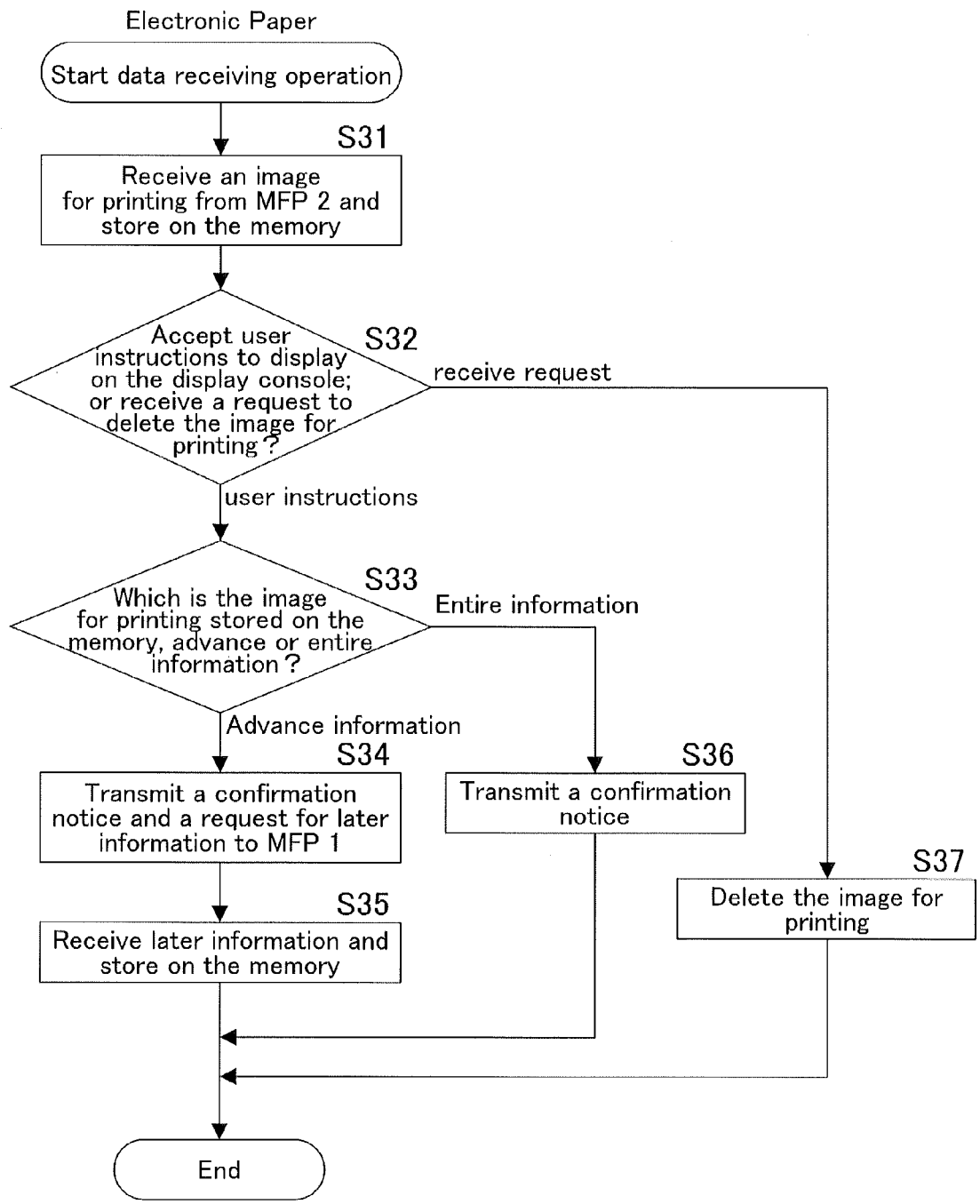
FIG. 12 is a flowchart representing the operation of electronic paper.

FIGS. 10 to 12 are flowcharts representing the operations that starts with transferring an image for printing to the MFP 2 from the PC 1 and finishes at displaying the image on a sheet of electronic paper 3, which will be described with reference to these flowcharts, hereinafter.

FIG. 10 is a flowchart representing the print instruction operation of the PC 1.

The PC 1 accepts instructions of an operator user for printing in Step S01, and the PC 1 transmits an image for printing and print information (such as either ordinary paper or electronic paper and the number of copies specified) in accordance with the user instructions in Step S02.

FIG. 11 is a flowchart that represents the print operation of the MFP 2. The operation is executed by the CPU 201 of the MFP 2 in accordance with an operation program stored on a memory such as the ROM 202.

In Step S11, an image for printing and print information are received from the PC 1 and stored on the memory 205. Then it is judged in Step S12 which is selected by the operator user, electronic paper or ordinary paper, on the basis of the print information. If it is electronic paper ("e-paper" in Step S12), the routine proceeds to Step S13; if it is ordinary paper ("ordinary paper" in Step S12), the routine proceeds to Step S27.

In Step S13, the number of sheets of electronic paper 3 loaded on the electronic paper storage 210 is compared to the number of copies specified. If the number of sheets of electronic paper 3 loaded thereon is greater than the number of copies specified ("number of e-paper>number of copies specified" in Step S13), advance information, a first page of the document is transferred to all the sheets of electronic paper 3 loaded thereon in Step S14. Then the routine proceeds to Step S16.

If the number of sheets of electronic paper 3 loaded thereon is equal to or lower than the number of copies specified ("number of e-paper≤number of copies specified" in Step S13), the entire information is transferred to all the sheets of electronic paper 3 loaded thereon in Step S15. Then the routine proceeds to Step S16.

In Step S16, it is judged: whether or not a confirmation notice is received from any of the sheets of electronic paper 3; whether or not a sheet of electronic paper 3 is additionally loaded on the electronic paper storage 210; or whether or not the operator user gives instructions to print on ordinary paper.

If a confirmation notice is received ("confirmation notice" in Step S16), the routine proceeds to Step S17, in which the number of confirmation notices having been received is incorporated into the number of copies seen that is the number of sheets of electronic paper 3 in reader users' hands. Then in Step S18, it is judged whether or not a request for the remaining page(s) of the document is received from any of the sheets of electronic paper 3, as later information.

If such a request is received ("receive request" in Step S18), the remaining page(s) of the document is transferred to the sheet of electronic paper 3 in Step S19, and the routine proceeds to Step S25. If no such request is received ("receive no request" in Step S18), the routine directly proceeds to Step S25.

In Step S16, if a sheet of electronic paper 3 is additionally loaded on the electronic paper storage 210 ("another sheet of e-paper" in Step S16), the number of the sheets of electronic paper 3 having received the image for printing is compared to the number of copies specified in Step S20.

If the number of the sheets of electronic paper 3 having received the image for printing is greater than the number of copies specified, i.e.; if the number of copies actually obtained exceeds the number of copies specified ("number of copies of e-paper>number of copies specified" in Step S20), the advance information is transferred to all the sheets of electronic paper 3 now loaded on the electronic paper storage 210, including the sheet of electronic paper 3 additionally loaded thereon, in Step S21. Then the routine proceeds to Step S25. In this case, a request to delete the image for printing that is transferred before the advance information is also transmitted to all the sheets of electronic paper 3.

If the number of sheets of electronic paper 3 having received the image for printing is equal to or lower than the number of copies specified ("number of copies of e-paper≤number of copies specified" in Step S20), the entire information is transferred to all the sheets of electronic paper 3 now loaded on the electronic paper storage 210 in Step S22. Then the routine proceeds to Step S25.

In Step S21, the advance information may be transferred only to the sheet of electronic paper 3 additionally loaded on the electronic paper storage 210, not all the sheets of electronic paper 3 now loaded thereon, including the sheet of electronic paper 3 additionally loaded thereon. In Step S22, the entire information may be transferred only to the sheet of electronic paper 3 additionally loaded on the electronic paper storage 210, not all the sheets of electronic paper 3 now loaded thereon, including the sheet of electronic paper 3 additionally loaded thereon.

Back to Step S16, if the operator user gives instructions to print on ordinary paper ("ordinary paper" in Step S16), the routine proceeds to Step S23, in which a first page or all pages of the document is (are) printed on ordinary paper until the number of copies specified via the operation panel 207 is reached. After the number of copies specified is incorporated into the number of copies seen in Step S24, the routine proceeds to Step S25.

In Step S25, the number of copies seen is compared to the number of copies specified. If the number of copies seen is lower than the number of copies specified ("total number of copies seen<number of copies specified" in Step S25), this means that there are one or more sheets of electronic paper 3 still not in reader users' hands, thus the routine returns to Step S16. If the number of copies seen is equal to or greater than the number of copies specified ("total number of copies seen≥number of copies specified" in Step S25), the routine proceeds to Step S26, in which a request to delete the image for printing is transmitted to a sheet of electronic paper 3 still not in reader user's hand, i.e., a sheet of electronic paper 3 still remaining in the electronic paper storage 210. Then the routine terminates.

In Step S12, if it is ordinary paper ("ordinary paper" in Step S12), a first page or all pages of the document is (are) printed on sheets of ordinary paper until the number of copies specified is reached in Step S27. After the number of copies specified is incorporated into the number of copies seen in Step S28, the routine terminates.

FIG. 12 is a flowchart representing the data receiving operation of a sheet of electronic paper 3. The operation is executed by the CPU 301 of the sheet of electronic paper 3 in accordance with an operation program stored on its memory such as the ROM 302.

In Step S31, an image for printing is received from the MFP 2 and stored on the memory 304. Then it is judged in Step S32 whether or not a reader user gives instructions to display an image after taking the sheet of electronic paper 3 out of the electronic paper storage 210; or whether or not a request to delete the image for printing is received from the MFP 2.

If a reader user gives instructions to display an image ("seen by user" in Step S32), then it is judged in Step S33 which is the image for printing stored on the memory 304, advance or entire information. If it is entire information ("entire information" in Step S33), a confirmation notice that confirms that the image has just been seen is transmitted to the MFP 2 in Step S36. Then the routine terminates. If it is advance information ("advance information" in Step S33), a confirmation notice and a request for the remaining page(s) of the document are transmitted to the MFP 2, in Step S34. In response to the request, the later information is received from the MFP 2 and stored on the memory 304 in Step S35. Then the routine terminates.

In Step S32, if a request to delete the image for printing is received ("deleting request received" in Step S32), the image for printing stored on the memory 304 is deleted in Step S37. Then the routine terminates.

In the aforementioned embodiment, an operator user performs print settings (e.g., selects electronic paper or ordinary paper and specifies the number of copies) and gives instructions for the MFP 2 to print on electronic paper by operating the PC 1. Alternatively, he/she may perform print settings and give instructions for printing by operating the operation panel 207 of the MFP 2. In this case, an image for printing to be transferred to the sheet of electronic paper 3 may be that of a physical document obtained by the scanner 204 or an image obtained from the memory 205.

When an operator user gives instructions to print on electronic paper by operating the operation panel 207, the MFP 2 would follow a very similar flowchart to that in FIG. 11: the very similar flowchart should have the step of allowing the operator user to specify an image for printing and enter print information from the operation panel 207, in place of Step S11 that is the step of receiving an image for printing and print information from the PC 1 to store on the memory 205.

The present invention, whose one embodiment has been described in detail herein, can solve the unsolved problems by its following modes.

[1] An image forming apparatus comprising:
   an electronic paper storage that loads one or more sheets of electronic paper;
   a print data transmitter that transmits a target image to the one or more sheets of electronic paper loaded on the electronic paper storage;
   a detector that detects when the target image is seen via any of the one or more sheets of electronic paper;
   a judgment portion that judges whether or not the number of sheets of electronic paper via which the target image has been seen reaches the number of copies specified by user; and
   a request transmitter that, if the number of sheets of electronic paper via which the target image has been seen reaches the number of copies specified while any of the one or more sheets of electronic paper still remains in the electronic paper storage without being seen, transmits a request to delete the target image to the remaining sheet of electronic paper.

[2] The image forming apparatus as recited in the foregoing item [1], further comprising a printer that prints on ordinary paper, an image identical with the target image transmitted to the one or more sheets of electronic paper loaded on the electronic paper storage, wherein:
   the judgment portion further judges whether or not the sum of the number of sheets of electronic paper via which the target image has been seen and that of prints actually obtained by the printer reaches the number of copies specified; and
   the request transmitter transmits a request to delete the target image to the remaining sheet of electronic paper if the sum of the number of sheets of electronic paper via which the target image has been seen and that of prints actually obtained by the printer reaches the number of copies specified.

[3] The image forming apparatus as recited in the foregoing item [1] or [2], wherein a sheet of electronic paper is additionally loaded on the electronic paper storage, then the print data transmitter transmits the target image to the sheet of electronic paper additionally loaded thereon if the number of sheets of electronic paper via which the target image has been seen does not reach the number of copies specified.

[4] The image forming apparatus as recited in the foregoing item [2], wherein a sheet of electronic paper is additionally loaded on the electronic paper storage, then the print data transmitter transmits the target image to the sheet of electronic paper additionally loaded thereon if the sum of the number of sheets of electronic paper via which the target image has been seen and that of prints actually obtained by the printer does not reach the number of copies specified.

[5] The image forming apparatus as recited in any one of the foregoing items [1] to [4], wherein the print data transmitter transmits advance information that is a part of the target image if the target image has not been seen via all the one or more sheets of electronic paper according to the detection result of the detector; the print data transmitter transmits the rest of the target image if the target image has been seen via all the one or more sheets of electronic paper according to the detection result of the detector.

[6] The image forming apparatus as recited in the foregoing item [5], wherein:
the print data transmitter transmits the advance information to all the one or more sheets of electronic paper loaded on the electronic paper storage if the number of the one or more sheets of electronic paper loaded thereon is greater than the number of copies specified; the print data transmitter transmits entire information that is the entire target image to all the one or more sheets of electronic paper loaded on the electronic paper storage if the number of the one or more sheets of electronic paper loaded thereon is equal to or lower than the number of copies specified; and
a sheet of electronic paper is additionally loaded on the electronic paper storage, then the print data transmitter transmits the entire information to the sheet of electronic paper additionally loaded thereon if the number of the sheets of electronic paper having received the target image is equal to or lower than the number of copies specified; the print data transmitter transmits the advance information to the sheet of electronic paper additionally loaded thereon or to all the sheets of electronic paper now loaded on the electronic paper storage, including the sheet of electronic paper additionally loaded thereon, if the number of the sheets of electronic paper having received the target image is greater than the number of copies specified.

[7] The image forming apparatus as recited in any one of the foregoing items [1] to [6], further comprising a scanner that obtains an image of a physical document by scanning the physical document, wherein the target image is the image obtained by the scanner or an image received from an information processing apparatus via a network.

[8] An electronic paper printing method to be implemented by an image forming apparatus comprising an electronic paper storage that loads one or more sheets of electronic paper, the electronic paper printing method comprising:
transmitting a target image to the one or more sheets of electronic paper loaded on the electronic paper storage;
detecting when the target image is seen via any of the one or more sheets of electronic paper;
judging whether or not the number of sheets of electronic paper via which the target image has been seen reaches the number of copies specified by user; and
if the number of sheets of electronic paper via which the target image has been seen reaches the number of copies specified while any of the one or more sheets of electronic paper still remains in the electronic paper storage without being seen, transmitting a request to delete the target image to the remaining sheet of electronic paper.

[9] The electronic paper printing method as recited in the foregoing item [8], further comprising printing on ordinary paper, an image identical with the target image transferred to the one or more sheets of electronic paper, wherein:
it is further judged whether or not the sum of the number of sheets of electronic paper via which the target image has been seen and that of prints actually obtained reaches the number of copies specified; and
a request to delete the target image is transmitted to the remaining sheet of electronic paper if the sum of the number of sheets of electronic paper via which the target image has been seen and that of prints actually obtained reaches the number of copies specified.

[10] The electronic paper printing method as recited in the foregoing item [8] or [9], wherein a sheet of electronic paper is additionally loaded on the electronic paper storage, then the target image is transmitted to the sheet of electronic paper additionally loaded thereon if the number of sheets of electronic paper via which the target image has been seen does not reach the number of copies specified.

[11] The electronic paper printing method as recited in the foregoing item [9], wherein a sheet of electronic paper is additionally loaded on the electronic paper storage, then the target image is transmitted to the sheet of electronic paper additionally loaded thereon if the sum of the number of sheets via which the target image has been seen and that of prints actually obtained is lower than the number of copies specified.

[12] The electronic paper printing method as recited in any one of the foregoing items [8] to [11], wherein advance information that is a part of the target image is transmitted if the target image has been seen via all the one or more sheets of electronic paper according to the detection result; the rest of the target image is transmitted after the target image has been seen via all the one or more sheets of electronic paper according to the detection result.

[13] The electronic paper printing method as recited in the foregoing item [12], wherein:
the advance information is transmitted to all the one or more sheets of electronic paper loaded on the electronic paper storage if the number of the one or more sheets of electronic paper loaded thereon is greater than the number of copies specified; entire information that is the entire target image is transmitted to all the one or more sheets of electronic paper loaded on the electronic paper storage if the number of the one or more sheets of electronic paper thereon is equal to or lower than the number of copies specified; and
a sheet of electronic paper is additionally loaded on the electronic paper storage, then the entire information is transmitted to the sheet of electronic paper additionally loaded thereon if the number of the sheets of electronic paper having received the target image is equal to or lower than the number of copies specified; the advance information is transmitted to the sheet of electronic paper additionally loaded thereon or to all the sheets of electronic paper now loaded on the electronic paper storage, including the sheet of electronic paper additionally loaded thereon, if the number of the sheets of electronic paper having received the target image is greater than the number of copies specified.

[14] The electronic paper printing method as recited in any one of the foregoing items [8] to [13], further comprising the step of obtaining an image of a physical document by scanning the physical document, wherein the target image is the image obtained by scanning the physical document or an image received from an information processing apparatus via a network.

[15] A non-transitory computer-readable recording medium with an electronic paper printing program being stored thereon to make a computer of an image forming apparatus comprising an electronic paper storage that loads one or more sheets of electronic paper, execute:

transmitting a target image to the one or more sheets of electronic paper loaded on the electronic paper storage;

detecting when the target image is seen via any of the one or more sheets of electronic paper;

judging whether or not the number of sheets of electronic paper via which the target image has been seen reaches the number of copies specified by user; and if the number of sheets of electronic paper via which the target image has been seen reaches the number of copies specified while any of the one or more sheets of electronic paper still remains in the electronic paper storage without being seen, transmitting a request to delete the target image to the remaining sheet of electronic paper.

[16] The non-transitory computer-readable recording medium as recited in the foregoing item [15], with the electronic paper printing program being stored thereon to further make the computer execute printing on ordinary paper, an image identical with the target image transferred to the one or more sheets of electronic paper, wherein:

it is further judged whether or not the sum of the number of sheets of electronic paper via which the target image has been seen and that of prints actually obtained reaches the number of copies specified; and a request to delete the target image is transmitted to the remaining sheet of electronic paper if the sum of the number of sheets of electronic paper via which the target image has been seen and that of prints actually obtained reaches the number of copies specified.

[17] The non-transitory computer-readable recording medium as recited in the foregoing item [15] or [16], with the electronic paper printing program being stored thereon, wherein a sheet of electronic paper is additionally loaded on the electronic paper storage, then the target image is transmitted to the sheet of electronic paper additionally loaded thereon if the number of sheets of electronic paper via which the target image has been seen does not reach the number of copies specified.

[18] The non-transitory computer-readable recording medium as recited in the foregoing item [16], with the electronic paper printing program being stored thereon, wherein a sheet of electronic paper is additionally loaded on the electronic paper storage, then the target image is transmitted to the sheet of electronic paper additionally loaded thereon if the sum of the number of sheets via which the target image has been seen and that of prints actually obtained is lower than the number of copies specified.

[19] The non-transitory computer-readable recording medium as recited in any one of the foregoing items [15] to [18], with the electronic paper printing program being stored thereon, wherein advance information that is a part of the target image is transmitted if the target image has been seen via all the one or more sheets of electronic paper according to the detection result; the rest of the target image is transmitted after the target image has been seen via all the one or more sheets of electronic paper according to the detection result.

[20] The non-transitory computer-readable recording medium as recited in the foregoing item [19], with the electronic paper printing program being stored thereon, wherein:

the advance information is transmitted to all the one or more sheets of electronic paper loaded on the electronic paper storage if the number of the one or more sheets of electronic paper loaded thereon is greater than the number of copies specified; entire information that is the entire target image is transmitted to all the one or more sheets of electronic paper loaded on the electronic paper storage if the number of the one or more sheets of electronic paper thereon is equal to or lower than the number of copies specified; and a sheet of electronic paper is additionally loaded on the electronic paper storage, then the entire information is transmitted to the sheet of electronic paper additionally loaded thereon if the number of the sheets of electronic paper having received the target image is equal to or lower than the number of copies specified; the advance information is transmitted to the sheet of electronic paper additionally loaded thereon or to all the sheets of electronic paper now loaded on the electronic paper storage, including the sheet of electronic paper additionally loaded thereon, if the number of the sheets of electronic paper having received the target image is greater than the number of copies specified.

[21] The non-transitory computer-readable recording medium as recited in any one of the foregoing items [15] to [20], with the electronic paper printing program being stored thereon to further make the computer execute obtaining an image of a physical document by scanning the physical document, wherein the target image is the image obtained by scanning the physical document or an image received from an information processing apparatus via a network.

According to the aforementioned mode of the invention [1], a target image is transmitted to one or more sheets of electronic paper loaded on the electronic paper storage; and when a user takes one of the one or more sheets of electronic paper out of the electronic paper storage to see the target image thereon, the detector detects that the target image is seen via that sheet of electronic paper; it is then judged whether or not the number of sheets of electronic paper via which the target image has been seen reaches the number of copies specified. If the number of sheets of electronic paper via which the target image has been seen reaches the number of copies specified while any of the one or more sheets of electronic paper still remains in the electronic paper storage without being seen, the remaining sheet of electronic paper deletes the target image.

As described above, a target image is transmitted to all the one or more sheets of electronic paper loaded on the electronic paper storage, regardless of how many they are actually; and if the number of sheets of electronic paper via which the target image has been seen reaches the number of copies specified while any of the one or more sheets of electronic paper still remains in the electronic paper storage, i.e., any of the one or more sheets of electronic paper has never been seen, the remaining sheet of electronic paper deletes the target image. An operator user therefore would be simply required to give instructions to print on electronic paper in the same manner as giving instructions to print on ordinary paper, without the trouble of having to make sure how many sheets of electronic paper are available and specify how many sheets of electronic paper will be actually necessary, which contributes to the improvement of user-friendliness.

According to the aforementioned mode of the invention [2], user can see the target image not only on electronic paper but also on ordinary paper; the remaining sheet of electronic paper deletes the target image if the sum of the number of sheets of electronic paper via which the target image has been seen and that of prints actually obtained by a printer reaches the number of copies specified.

According to the aforementioned mode of the invention [3], a sheet of electronic paper is additionally loaded on the electronic paper storage, then the target image is transmitted to the sheet of electronic paper additionally loaded thereon if the number of sheets of electronic paper via which the target image has been seen reaches the number of copies specified.

According to the aforementioned mode of the invention [4], a sheet of electronic paper is additionally loaded on the electronic paper storage, then the target image is transmitted to the sheet of electronic paper additionally loaded thereon if the sum of the number of sheets of electronic paper via which the target image has been seen and that of prints actually obtained by a printer reaches the number of copies specified.

According to the aforementioned mode of the invention [5], advance information that is a part of the target image is transmitted if the target image has not been seen via all the one or more sheets of electronic paper; the rest of the target image is transmitted if the target image has been seen via all the one or more sheets of electronic paper, which contributes to making more effective use of the memory capacity of each sheet of electronic paper than transmitting the entire target image at one time.

According to the aforementioned mode of the invention [6], entire information that is the entire target image is transmitted to any of the one or more sheets of electronic paper loaded on the electronic paper storage, which would highly possibly be seen; if the number of the sheets of electronic paper having received the target image is greater than the number of copies specified because of additionally loading a sheet of electronic paper on the electronic paper storage, the advance information is transmitted to the sheet of electronic paper additionally loaded thereon or to all the sheets of electronic paper loaded thereon, including the sheet of electronic paper additionally loaded thereon, because it or they would hardly be seen.

According to the aforementioned mode of the invention [7], an image of a physical document obtained by a scanner or an image received from an information processing apparatus via a network can be used as the target image.

According to the aforementioned mode of the invention [8], a target image is transmitted to one or more sheets of electronic paper loaded on the electronic paper storage, regardless of how many they are actually; and if the number of sheets of electronic paper via which the target image has been seen reaches the number of copies specified while any of the one or more sheets of electronic paper still remains in the electronic paper storage, i.e., any of the one or more sheets of electronic paper has never been seen, the target image on the remaining sheet of electronic paper is deleted.

According to the aforementioned mode of the invention [9], if the sum of the number of sheets of electronic paper via which the target image has been seen and that of prints actually obtained reaches the number of copies specified, the target image on the remaining sheet of electronic paper is deleted.

According to the aforementioned mode of the invention [10], a sheet of electronic paper is additionally loaded on the electronic paper storage, then the target image is transmitted to the sheet of electronic paper additionally loaded on the electronic paper storage if the number of sheets of electronic paper via which the target image has been seen reaches the number of copies specified.

According to the aforementioned mode of the invention [11], a sheet of electronic paper is additionally loaded on the electronic paper storage, then if the sum of the number of sheets of electronic paper via which the target image has been seen and that of prints actually obtained reaches the number of copies specified, the target image is transmitted to the sheet of electronic paper additionally loaded thereon.

According to the aforementioned mode of the invention [12], advance information that is a part of the target image is transmitted if the target image has not been seen via all the one or more sheets of electronic paper; the rest of the target image is transmitted if the target image has been seen via all the one or more sheets of electronic paper.

According to the aforementioned mode of the invention [13], entire information that is the entire target image is transmitted if the number of the sheets of electronic paper loaded on the electronic paper storage is equal to or lower than the number of copies specified; the advance information is transmitted if the number of the sheets of electronic paper loaded on the electronic paper storage is greater than the number of copies specified.

According to the aforementioned mode of the invention [14], an image of a physical document obtained by a scanner or an image received from an information processing apparatus via a network can be used as the target image.

According to the aforementioned mode of the invention [15], a computer of the image forming apparatus is allowed to: transmit a target image to one or more sheets of electronic paper loaded on the electronic paper storage, regardless of how many they are actually; and if the number of sheets of electronic paper via which the target image has been seen reaches the number of copies specified while any of the one or more sheets of electronic paper still remains in the electronic paper storage, i.e., any of the one or more sheets of electronic paper has never been seen, transmit a request to delete the target image to the remaining sheet of electronic paper.

According to the aforementioned mode of the invention [16], a computer of the image forming apparatus is allowed to transmit a request to delete the target image to the remaining sheet of electronic paper if the sum of the number of sheets of electronic paper via which the target image has been seen and that of prints actually obtained reaches the number of copies specified.

According to the aforementioned mode of the invention [17], a sheet of electronic paper is additionally loaded on the electronic paper storage, then a computer of the image forming apparatus is allowed to transmit the target image to the sheet of electronic paper additionally loaded thereon, if the number of sheets of electronic paper via which the target image has been seen reaches the number of copies specified.

According to the aforementioned mode of the invention [18], a sheet of electronic paper is additionally loaded on the electronic paper storage, then a computer of the image forming apparatus is allowed to transmit the target image to the sheet of electronic paper additionally loaded thereon, if the sum of the number of sheets of electronic paper via which the target image has been seen and that of prints actually obtained does not reach the number of copies specified.

According to the aforementioned mode of the invention [19], a computer of the image forming apparatus is allowed to: transmit advance information that is a part of the target image if the target image has not been seen via all the one or more sheets of electronic paper; and transmit the rest of the target image if the target image has been seen via all the one or more sheets of electronic paper.

According to the aforementioned mode of the invention [20], a computer of the image forming apparatus is allowed to: transmit entire information that is the entire target image if the number of the sheets of electronic paper loaded on the electronic paper storage is equal to or lower than the number of copies specified; and transmit the advance information if the number of the sheets of electronic paper loaded on the electronic paper storage is greater than the number of copies specified.

According to the aforementioned mode of the invention [21], an image of a physical document obtained by scanning the physical document or an image received from an information processing apparatus via a network can be used as the target image.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising: an electronic paper storage that loads one or more sheets of electronic paper; a print data transmitter that transmits a target image to the one or more sheets of electronic paper loaded on the electronic paper storage; a detector that detects when the target image is seen via any of the one or more sheets of electronic paper; a judgment portion that judges whether or not a number of sheets of electronic paper via which the target image has been seen reaches a number of copies specified by a user; and a request transmitter that, if the number of sheets of electronic paper via which the target image has been seen reaches the number of copies specified by the user while any of the one or more sheets of electronic paper still remains in the electronic paper storage without being seen, transmits a request to delete the target image to the remaining sheet of electronic paper.

2. The image forming apparatus as recited in claim 1, further comprising a printer that prints on ordinary paper, an image identical with the target image transmitted to the one or more sheets of electronic paper loaded on the electronic paper storage, wherein: the judgment portion further judges whether or not a sum of the number of sheets of electronic paper via which the target image has been seen and that of prints actually obtained by the printer reaches the number of copies specified by the user; and the request transmitter transmits a request to delete the target image to the remaining sheet of electronic paper if the sum of the number of sheets of electronic paper via which the target image has been seen and that of prints actually obtained by the printer reaches the number of copies specified by the user.

3. The image forming apparatus as recited in claim 2, wherein a sheet of electronic paper is additionally loaded on the electronic paper storage, then the print data transmitter transmits the target image to the sheet of electronic paper additionally loaded thereon if the sum of the number of sheets of electronic paper via which the target image has been seen and that of prints actually obtained by the printer does not reach the number of copies specified by the user.

4. The image forming apparatus as recited in claim 1, wherein a sheet of electronic paper is additionally loaded on the electronic paper storage, then the print data transmitter transmits the target image to the sheet of electronic paper additionally loaded thereon if the number of sheets of electronic paper via which the target image has been seen does not reach the number of copies specified by the user.

5. The image forming apparatus as recited in claim 1, wherein the print data transmitter transmits advance information that is a part of the target image if the target image has not been seen via all the one or more sheets of electronic paper according to the detection result of the detector; the print data transmitter transmits the rest of the target image if the target image has been seen via all the one or more sheets of electronic paper according to the detection result of the detector.

6. The image forming apparatus as recited in claim 5, wherein: the print data transmitter transmits the advance information to all the one or more sheets of electronic paper loaded on the electronic paper storage if the number of the one or more sheets of electronic paper loaded thereon is greater than the number of copies specified by the user; the print data transmitter transmits entire information that is the entire target image to all the one or more sheets of electronic paper loaded on the electronic paper storage if the number of the one or more sheets of electronic paper loaded thereon is equal to or lower than the number of copies specified by the user; and a sheet of electronic paper is additionally loaded on the electronic paper storage, then the print data transmitter transmits the entire information to the sheet of electronic paper additionally loaded thereon if the number of the sheets of electronic paper having received the target image is equal to or lower than the number of copies specified by the user; the print data transmitter transmits the advance information to the sheet of electronic paper additionally loaded thereon or to all the sheets of electronic paper now loaded on the electronic paper storage, including the sheet of electronic paper additionally loaded thereon, if the number of the sheets of electronic paper having received the target image is greater than the number of copies specified by the user.

7. The image forming apparatus as recited in claim 1, further comprising a scanner that obtains an image of a physical document by scanning the physical document, wherein the target image is the image obtained by the scanner or an image received from an information processing apparatus via a network.

8. An electronic paper printing method to be implemented by an image forming apparatus comprising an electronic paper storage that loads one or more sheets of electronic paper, the electronic paper printing method comprising: transmitting a target image to the one or more sheets of electronic paper loaded on the electronic paper storage; detecting when the target image is seen via any of the one or more sheets of electronic paper; judging whether or not a number of sheets of electronic paper via which the target image has been seen reaches a number of copies specified by a user; and if the number of sheets of electronic paper via which the target image has been seen reaches the number of copies specified by the user while any of the one or more sheets of electronic paper still remains in the electronic paper storage without being seen, transmitting a request to delete the target image to the remaining sheet of electronic paper.

9. The electronic paper printing method as recited in claim 8, further comprising printing on ordinary paper, an image identical with the target image transferred to the one or more sheets of electronic paper, wherein: it is further judged whether or not a sum of the number of sheets of electronic paper via which the target image has been seen and that of prints actually obtained reaches the number of copies specified by the user; and a request to delete the target image is transmitted to the remaining sheet of electronic paper if the sum of the number of sheets of electronic paper via which the target image has been seen and that of prints actually obtained reaches the number of copies specified by the user.

10. The electronic paper printing method as recited in claim 9, wherein a sheet of electronic paper is additionally loaded on the electronic paper storage, then the target image is transmitted to the sheet of electronic paper additionally loaded thereon if the sum of the number of sheets via which the target image has been seen and that of prints actually obtained is lower than the number of copies specified by the user.

11. The electronic paper printing method as recited in claim 8, wherein a sheet of electronic paper is additionally loaded on the electronic paper storage, then the target image is transmitted to the sheet of electronic paper additionally loaded thereon if the number of sheets of electronic paper via which the target image has been seen does not reach the number of copies specified by the user.

12. The electronic paper printing method as recited in claim 8, wherein advance information that is a part of the target image is transmitted if the target image has been seen via all the one or more sheets of electronic paper according to the detection result; the rest of the target image is transmitted after the target image has been seen via all the one or more sheets of electronic paper according to the detection result.

13. The electronic paper printing method as recited in claim as recited in claim 12, wherein: the advance information is transmitted to all the one or more sheets of electronic paper loaded on the electronic paper storage if the number of the one or more sheets of electronic paper loaded thereon is greater than the number of copies specified by the user; entire information that is the entire target image is transmitted to all the one or more sheets of electronic paper loaded on the electronic paper storage if the number of the one or more sheets of electronic paper thereon is equal to or lower than the number of copies specified by the user; and a sheet of electronic paper is additionally loaded on the electronic paper storage, then the entire information is transmitted to the sheet of electronic paper additionally loaded thereon if the number of the sheets of electronic paper having received the target image is equal to or lower than the number of copies specified by the user; the advance information is transmitted to the sheet of electronic paper additionally loaded thereon or to all the sheets of electronic paper now loaded on the electronic paper storage, including the sheet of electronic paper additionally loaded thereon, if the number of the sheets of electronic paper having received the target image is greater than the number of copies specified.

14. The electronic paper printing method as recited in claim 8, further comprising the step of obtaining an image of a physical document by scanning the physical document, wherein the target image is the image obtained by scanning the physical document or an image received from an information processing apparatus via a network.

15. A non-transitory computer-readable recording medium with an electronic paper printing program being stored thereon to make a computer of an image forming apparatus comprising an electronic paper storage that loads one or more sheets of electronic paper, execute: transmitting a target image to the one or more sheets of electronic paper loaded on the electronic paper storage; detecting when the target image is seen via any of the one or more sheets of electronic paper; judging whether or not a number of sheets of electronic paper via which the target image has been seen reaches a number of copies specified by a user; and if the number of sheets of electronic paper via which the target image has been seen reaches the number of copies specified by the user while any of the one or more sheets of electronic paper still remains in the electronic paper storage without being seen, transmitting a request to delete the target image to the remaining sheet of electronic paper.

16. The non-transitory computer-readable recording medium as recited in claim 15, with the electronic paper printing program being stored thereon to further make the computer execute printing on ordinary paper, an image identical with the target image transferred to the one or more sheets of electronic paper, wherein: it is further judged whether or not a sum of the number of sheets of electronic paper via which the target image has been seen and that of prints actually obtained reaches the number of copies specified by the user; and a request to delete the target image is transmitted to the remaining sheet of electronic paper if the sum of the number of sheets of electronic paper via which the target image has been seen and that of prints actually obtained reaches the number of copies specified by the user.

17. The non-transitory computer-readable recording medium as recited in claim 16, with the electronic paper printing program being stored thereon, wherein a sheet of electronic paper is additionally loaded on the electronic paper storage, then the target image is transmitted to the sheet of electronic paper additionally loaded thereon if the sum of the number of sheets via which the target image has been seen and that of prints actually obtained is lower than the number of copies specified by the user.

18. The non-transitory computer-readable recording medium as recited in claim 15, with the electronic paper printing program being stored thereon, wherein a sheet of electronic paper is additionally loaded on the electronic paper storage, then the target image is transmitted to the sheet of electronic paper additionally loaded thereon if the number of sheets of electronic paper via which the target image has been seen does not reach the number of copies specified by the user.

19. The non-transitory computer-readable recording medium as recited in claim 15, with the electronic paper printing program being stored thereon, wherein advance information that is a part of the target image is transmitted if the target image has been seen via all the one or more sheets of electronic paper according to the detection result; the rest of the target image is transmitted after the target image has been seen via all the one or more sheets of electronic paper according to the detection result.

20. The non-transitory computer-readable recording medium as recited in claim 19, with the electronic paper printing program being stored thereon, wherein: the advance information is transmitted to all the one or more sheets of electronic paper loaded on the electronic paper storage if the number of the one or more sheets of electronic paper loaded thereon is greater than the number of copies specified by the user; entire information that is the entire target image is transmitted to all the one or more sheets of electronic paper loaded on the electronic paper storage if the number of the one or more sheets of electronic paper thereon is equal to or lower than the number of copies specified by the user; and a sheet of electronic paper is additionally loaded on the electronic paper storage, then the entire information is transmitted to the sheet of electronic paper additionally loaded thereon if the number of the sheets of electronic paper having received the target image is equal to or lower than the number of copies specified by the user; the advance information is transmitted to the sheet of electronic paper additionally loaded thereon or to all the sheets of electronic paper now loaded on the electronic paper storage, including the sheet of electronic paper additionally loaded thereon, if the number of the sheets of electronic paper having received the target image is greater than the number of copies specified by the user.

21. The non-transitory computer-readable recording medium as recited in claim 15, with the electronic paper printing program being stored thereon to further make the computer execute obtaining an image of a physical document by scanning the physical document, wherein the target image is the image obtained by scanning the physical document or an image received from an information processing apparatus via a network.

* * * * *